United States Patent
Cazaux et al.

(10) Patent No.: US 9,561,949 B2
(45) Date of Patent: Feb. 7, 2017

(54) FILLER DEVICE FOR A FLUID TANK

(71) Applicant: TURBOMECA, Bordes (FR)

(72) Inventors: Yannick Cazaux, Arbus (FR); Sebastien Brotier, Borderes sur l'Echez (FR); Armand Bueno, Assat (FR); Lionel Renault, Bosdarros (FR)

(73) Assignee: TURBOMECA, Bordes (FR)

( * ) Notice: Subject to any disclaimer, the term of this patent is extended or adjusted under 35 U.S.C. 154(b) by 217 days.

(21) Appl. No.: 14/413,803

(22) PCT Filed: Jul. 5, 2013

(86) PCT No.: PCT/FR2013/051607
§ 371 (c)(1),
(2) Date: Jan. 9, 2015

(87) PCT Pub. No.: WO2014/009640
PCT Pub. Date: Jan. 16, 2014

(65) Prior Publication Data
US 2015/0203343 A1    Jul. 23, 2015

(30) Foreign Application Priority Data
Jul. 10, 2012 (FR) ..................................... 12 56623

(51) Int. Cl.
*B65B 1/30* (2006.01)
*B67D 7/36* (2010.01)
(Continued)

(52) U.S. Cl.
CPC ............. *B67D 7/365* (2013.01); *B64D 37/005* (2013.01); *B64D 37/16* (2013.01); *F16K 15/04* (2013.01);
(Continued)

(58) Field of Classification Search
CPC ....... B64D 37/005; B64D 37/16; B65D 90/26; B67D 7/365; F16K 15/04; F16K 15/044; F16K 31/22; F16K 31/30
See application file for complete search history.

(56) References Cited

U.S. PATENT DOCUMENTS 1,772,588 A    8/1930  Macrae
1,878,947 A *  9/1932  Luff ........................ F16K 33/00
                                                    137/433

(Continued)

FOREIGN PATENT DOCUMENTS

EP    0 071 831    2/1983
EP    0 233 445    8/1987
(Continued)

OTHER PUBLICATIONS

International Search Report issued Sep. 10, 2013 in PCT/FR13/051607 filed Jul. 5, 2013.

*Primary Examiner* — Timothy L Maust
*Assistant Examiner* — Randall Gruby
(74) *Attorney, Agent, or Firm* — Oblon, McClelland, Maier & Neustadt, L.L.P.

(57) ABSTRACT

A filler device for a fluid tank, including: a filler duct; a first stopper, for preventing overfilling of the tank, and a second stopper for preventing fluid from leaving the tank in unwanted manner; a first float mechanically connected to the first stopper such that, on being placed in a predetermined position, the first float closes the first stopper; and a holder system for holding the second stopper, which system, when fluid leaves the tank, closes the second stopper, and when fluid enters into the tank, opens the second stopper. In an operating position of the device, and under effect of a heavy element, the holder system acts continuously on the second stopper, tending to maintain the second stopper permanently in its closed position.

10 Claims, 4 Drawing Sheets

(51) Int. Cl.
*B64D 37/16* (2006.01)
*B64D 37/00* (2006.01)
*F16K 31/22* (2006.01)
*F16K 31/30* (2006.01)
*F16K 15/04* (2006.01)
*B65D 90/26* (2006.01)

(52) U.S. Cl.
CPC ............ *F16K 15/044* (2013.01); *F16K 31/22* (2013.01); *F16K 31/30* (2013.01); *B65D 90/26* (2013.01)

(56) References Cited

U.S. PATENT DOCUMENTS

| | | | | |
|---|---|---|---|---|
| 1,897,492 A * | 2/1933 | Ledoux | ............... | G05D 11/006 116/228 |
| 2,122,866 A * | 7/1938 | Lippold | ................... | B67C 3/22 137/432 |
| 2,280,876 A * | 4/1942 | Zugelter | ................... | E03B 9/20 137/206 |
| 2,972,412 A * | 2/1961 | Lundeen | ................... | C02F 1/42 137/192 |
| 3,089,508 A * | 5/1963 | Schulze | ................. | C02F 1/688 126/206 |
| 3,105,512 A * | 10/1963 | Lyall | ...................... | F16K 31/08 137/416 |
| 3,144,045 A | 8/1964 | Fitzpatrick | | |
| 3,146,788 A * | 9/1964 | Mahlstedt | ............ | B01J 49/0086 137/399 |
| 3,202,174 A * | 8/1965 | Rudelick | ................. | F16K 31/22 137/391 |
| 3,477,611 A * | 11/1969 | Niles | ...................... | B60K 15/03 220/202 |
| 3,752,355 A * | 8/1973 | Weissenbach | ... | B60K 15/03504 220/723 |
| 3,791,404 A * | 2/1974 | Stevens | ................... | F16K 31/22 137/433 |
| 3,822,715 A * | 7/1974 | Rao | ......................... | E02B 13/02 137/135 |
| 3,838,706 A * | 10/1974 | Klenk | ................... | E03F 5/0407 137/247.19 |
| 3,929,155 A | 12/1975 | Garretson | | |
| 4,104,004 A * | 8/1978 | Graef | ...................... | F04B 53/06 137/202 |
| 4,561,258 A * | 12/1985 | Brodbeck | ................ | F17C 9/00 137/436 |
| 4,627,460 A * | 12/1986 | Eising | .................... | F01N 3/005 137/192 |
| 4,630,749 A * | 12/1986 | Armstrong | ............... | B67D 7/54 141/59 |
| 4,637,426 A * | 1/1987 | Lyon | ...................... | F16K 15/04 137/433 |
| 4,701,198 A * | 10/1987 | Uranishi | ............ | B01D 19/0063 123/519 |
| 4,744,109 A * | 5/1988 | Yuill | ...................... | E03C 1/288 137/192 |
| 4,765,504 A * | 8/1988 | Sherwood | ........ | B60K 15/03519 141/59 |
| 4,798,306 A * | 1/1989 | Giacomazzi | ...... | B60K 15/03519 137/588 |
| 4,852,357 A * | 8/1989 | Porter | ...................... | F17C 9/00 62/50.4 |
| 5,159,953 A | 11/1992 | Sato et al. | | |
| 5,787,942 A | 8/1998 | Preston et al. | | |
| 6,267,137 B1 | 7/2001 | Watanabe et al. | | |
| 2007/0193650 A1 | 8/2007 | Annati | | |

FOREIGN PATENT DOCUMENTS

GB        534 854       3/1941
GB      1 531 502     11/1978
GB      2 468 147      9/2010

* cited by examiner

FILLER DEVICE FOR A FLUID TANK

The invention relates to a filler device for a fluid tank, in particular the tanks on board aircraft, such as helicopters. The term "filler device" is used herein to mean a device having a filler duct through which fluid is injected into the tank while the tank is being filled. The device may perform various auxiliary functions in order to give the tank additional functions.

On board aircraft, safety concerns can require that the presence of a blanket of gas is ensured permanently over the fluid in the liquid state inside the tank.

In known manner, in order to achieve this result, and as shown in FIG. 1, a tank 10 may have a tank body 12, a suction orifice 14, and a filler orifice 1. In FIG. 1, the dashed line 16 shows the highest level of fluid that is acceptable inside the tank. The inside space situated inside the body of the tank 12 above this line 16 must not contain fluid in the liquid phase.

With the tank 10, it is the position of the filler device 1 that prevents it being possible to fill the tank 10 above the line 16. For this purpose, the device 1 is placed in such a manner that if filling of the tank is not interrupted beforehand, and if the fluid inside the tank 10 reaches the level of the line 16, then any additional quantity of fluid that might be injected into the tank 10 leaves the tank merely under gravity via the device 1. Specifically, the outlet orifice of the device 1 is arranged at the same level (i.e. at the same height) as the line 16.

That technical solution for preventing the tank being filled excessively presents the drawback of requiring the filler device to be arranged at the maximum height for fluid that is to be contained in the tank (height shown in FIG. 1 by the line 16).

Furthermore, in general, the external end of the filler duct situated outside of the body of the tank is generally designed to receive a stopper in the form of a cap that can be operated by hand and that serves to close the tank. If the cap is not put back into place once the tank has been filled, then fluid can escape from the tank in unwanted manner via the filler device, e.g. under the effect of vibration and of turbulent air affecting the aircraft.

There therefore exists a need for a fluid filler device that, while remaining relatively simple:

provides protection against overfilling by ensuring that the injection of fluid into the tank cannot lead to fluid inside the tank being at a level that exceeds a predetermined level, and does so without requiring the filler device to be arranged at a predetermined specific height relative to the body of the tank; and automatically provides a non-return function, i.e. prevents fluid escaping in unwanted manner from the tank via the filler device.

This object is achieved by means of a filler device for a fluid tank, the device comprising:

a filler duct;

a first stopper, for preventing overfilling of the tank, and a second stopper for preventing fluid from leaving the tank in unwanted manner;

a first float mechanically connected to the first stopper in such a manner that placing the first float in a predetermined position places the first stopper in a closed position or at least in a substantially closed position; and a holder system for holding the second stopper, which system acts, no later than the fluid beginning to pass along the duct in a direction opposite to the tank-filling direction, to place the second stopper in the closed position, and when a fluid passes along the duct in the filling direction, to place the second stopper in the open position;

each of said stoppers being suitable for being placed in an open position in which it allows fluid to pass along the duct, or in a closed position in which it plugs the duct; and wherein the holder system is arranged in such a manner that in an operating position of the device, under the effect of the weight of a heavy element, the holder system tends permanently to maintain the second stopper in its closed position.

Concerning the first float, it can be understood that when it is below the predetermined position, the first stopper is in the open position (possibly only partially open). It can also be understood that the movement of the first float causes the first stopper to move, and consequently also holds the first stopper in the position that corresponds to the position adopted by the first float.

Naturally, the first float is moved by buoyancy thrust, which presses against it when it is immersed in the fluid contained in the tank.

While the tank is being filled, the first float is moved upwards little by little by the fluid. It is this movement that causes the first stopper to pass into the closed position, and consequently causes filling of the tank to stop.

Furthermore, the tank is not necessarily fitted with means that act on the fluid source outside the tank in order to stop filling of the tank. Advantageously, the function performed by the filler device is to interrupt entry of fluid into the tank, as soon as the level of fluid in the tank reaches a predetermined level. This interruption is triggered by closure of the first stopper.

At the moment when the first stopper closes, in most embodiments, the upstream portion of the filler duct then fills with fluid very quickly; it thus overflows. Overflowing of the filler duct is detected by the person in charge of filling, and leads that person to interrupt filling of the tank immediately. The closure of the first stopper can thus prevent the tank being overfilled.

Furthermore, the device is generally arranged in such a manner that, after fluid begins to pass along the duct in a direction opposite to the filling direction, or even before it begins to pass in this direction, the holder system for holding the second stopper has placed the second stopper in the closed position, and the holder system maintains the second stopper in the closed position, with this continuing in practice until fluid is injected into the tank via the filler duct.

The following provisions may be adopted, singly or in combination:

the first float and the first stopper may be the same part or parts, thereby limiting the number of parts.

an internal surface of the duct may present a seat portion, and in the closed position, the first and/or the second stopper may plug the duct at said seat portion.

the duct may present one end connected in leaktight manner to at least one outlet orifice, and in the closed position, the first and/or the second stopper plugs said at least one outlet orifice. As a result, the outlet orifice (s) is/are not formed in the duct itself, but in contrast is/are connected thereto in leaktight manner.

the device may include a guide suitable for guiding the first float to move in translation; by way of example, this guide may be constituted by a tubular portion of the duct around which the first float is arranged, which float is in the form of a sleeve, for example. This comprises a particularly simple embodiment for the float.

the duct may include at least one fluid outlet orifice; the first float and the first stopper may be fastened to a lever arm mounted on a pivot that is fixed relative to the duct; the device may then be arranged in such a manner that pivoting of the lever arm about the pivot moves the first stopper between its open and closed positions. The lever presents the advantage of increasing the force exerted on the first stopper.

the holder system is arranged to urge the second stopper continuously in the direction that tends to cause the duct to be closed, at least while the tank is in its operating position, as mentioned above. Preferably, the holder system may be arranged in such a manner that during the filling of the tank, the opening force acting on the second stopper causes it to open in spite of the force exerted under the effect of the weight of the heavy element.

the holder system may be adapted to hold the second stopper closed or at least substantially closed, even when the upstream portion of the duct is full of fluid. The term "substantially closed" is used herein to mean that a small leakage flow rate is acceptable, providing it remains less than 20% of the usual filling flow rate of the tank.

the holder system may be configured to make use of a return force selected from the group comprising: a gas pressure; a resilient force, e.g. from a spring; a buoyancy thrust; a weight; a magnetic force; and an electric force.

the holder system may include a resilient element, e.g. a spring.

the heavy element may be constituted by a ball or a weight that also constitutes the second stopper; an internal surface of the duct may present a seat portion; and the duct may be arranged in such a manner that in the normal position of the device, under the effect of gravity, the ball or weight tends to move onto the seat portion and thus to plug the duct.

the seat portion may be formed in a filling direction downstream from a bend forming an angle, in particular an angle that is close to 180°.

the heavy element and the second stopper may be fastened on a lever arm mounted on a pivot that is fixed relative to the duct; and the device is then arranged in such a manner that pivoting of the lever arm about the pivot moves the second stopper between its open and closed positions.

the first stopper and the second stopper may be the same part or parts.

the second stopper may be arranged in such a manner that, if pressure inside the tank is greater than pressure outside the tank, the pressure difference between the tank and the outside of the tank holds the second stopper in the closed position.

when the first float is placed in the above-mentioned predetermined position, the first stopper remains in a substantially closed position, with this continuing even when an upstream portion of the duct, situated upstream from the first stopper in the filling direction, is full of fluid.

Furthermore, in an alternative manner, instead of having a heavy element, the holder system may comprise a fluid-retention receptacle that is arranged around one end of the duct, and a second float arranged in the receptacle; the holder system (and more particularly the volume of the second float and the arrangement of the mechanical connection between the second float and the second stopper) being arranged in such a manner that when the device is in the operating position and when the receptacle is full of fluid, then under the effect of the buoyancy thrust acting on the second float, the holder system tends to hold the second stopper in its closed position. This system is particularly simple and robust.

The above-mentioned improvements may equally well be implemented in this particular embodiment, in so far as they are technically compatible.

Also, in this embodiment, the second float and the second stopper may be the same part or parts.

The invention applies in particular to a fluid tank having a filler device as defined above, and consequently to a turbine engine having a tank of this type.

The invention can be well understood and its advantages appear better on reading the following detailed description of embodiments shown as nonlimiting examples. The description refers to the accompanying drawings, in which.

In these figures, corresponding or identical elements in the various embodiments are given the same reference signs and in general they are described only once.

Furthermore, all of the embodiments described are identical, except for the differences specified in the description.

Figure 1:
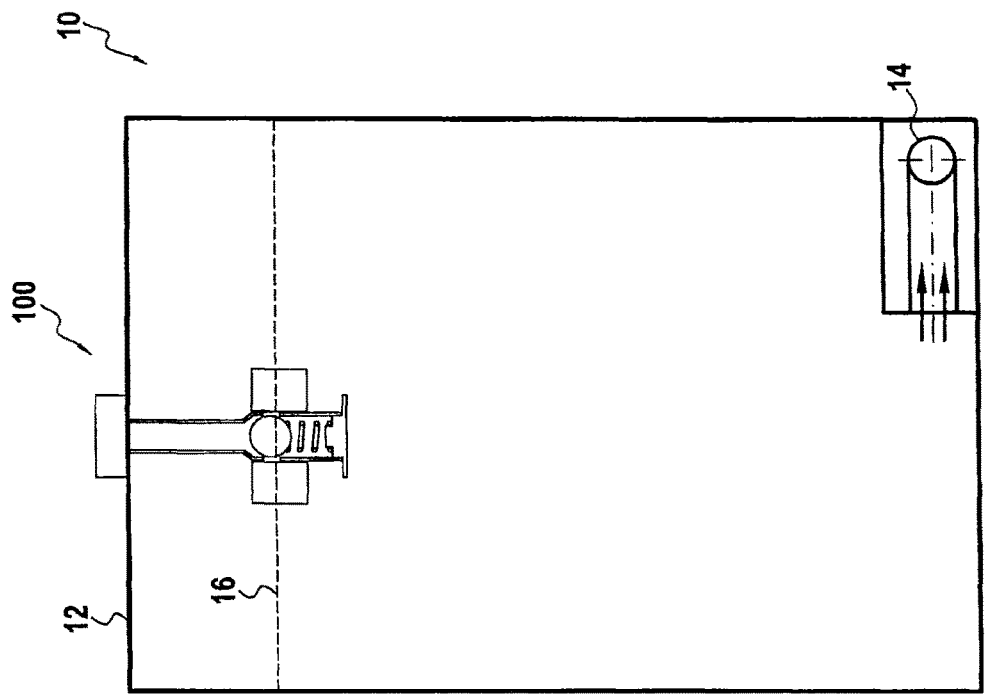
FIG. 1 is a diagrammatic vertical section view of a prior art fuel tank for a helicopter.
Figure 2:
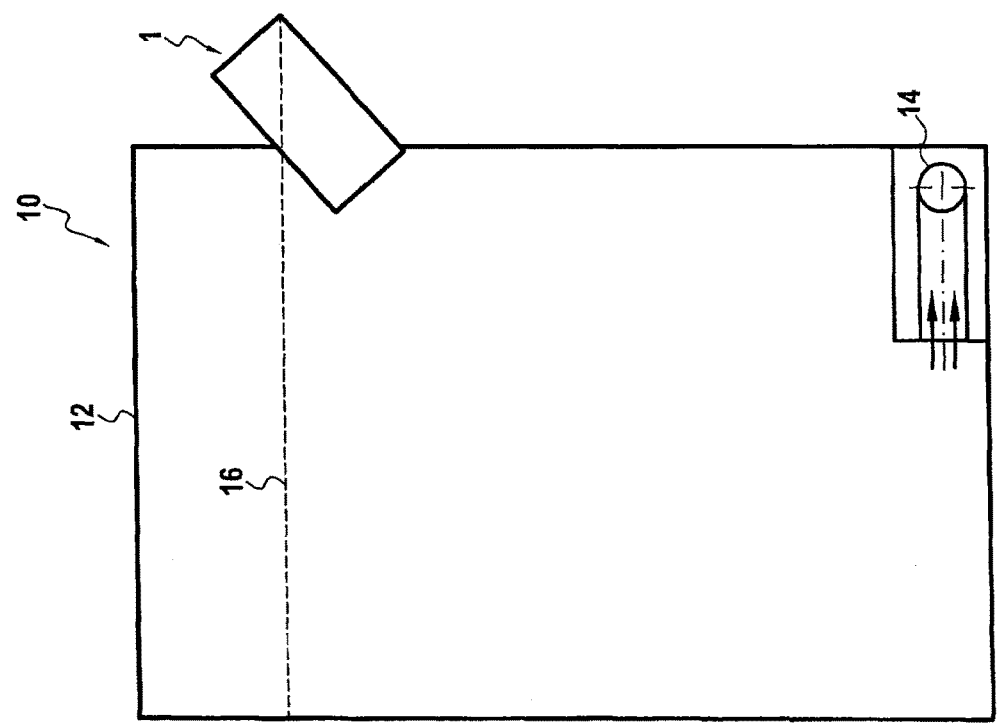
FIG. 2 is a diagrammatic vertical section view of a fuel tank for a helicopter including a filler device in a first embodiment.

FIG. 2 shows a fuel tank 10 mounted in a helicopter (not shown).

The tank has a filler device 100 mounted thereon. Advantageously, the filler device is mounted on the top portion of the tank 10, and is not constrained to be mounted at the maximum height for filling the tank, as represented by dashed line 16.

Figure 3:
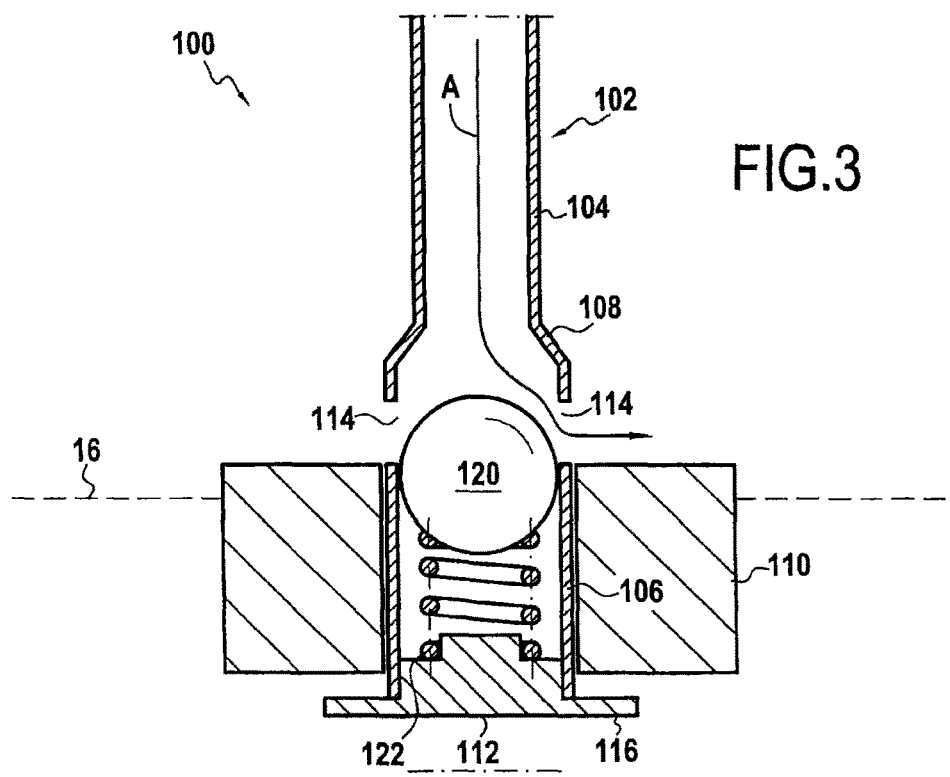
FIGS. 3 and 4 are fragmentary diagrammatic views in vertical section of the FIG. 2 filler device shown in two different operating configurations.
Figure 4:
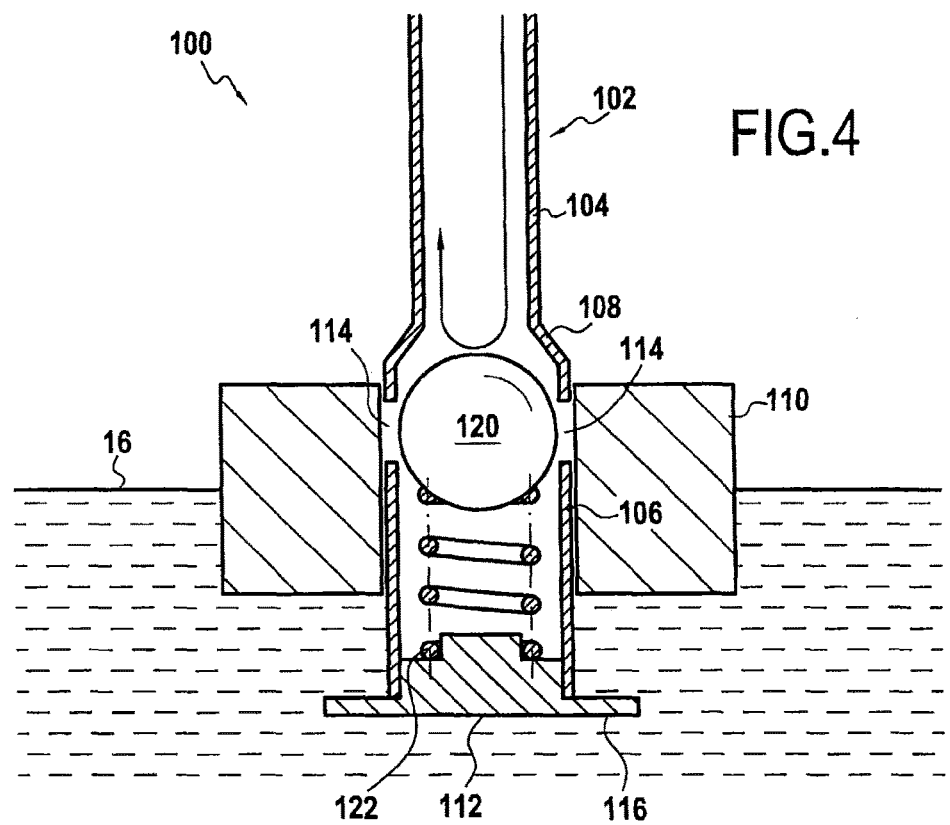

FIGS. 3 and 4 show the bottom portion of the device 100, in the configurations that it takes up for levels of fluid in the tank 10 that are respectively low and high.

The device 100 has a filler duct comprising a filler duct 102, a first stopper 110 for preventing overfilling of the tank, and a second stopper 120 for preventing fluid from leaving the tank in unwanted manner.

The filler duct 102 is generally a rectilinear tube fastened through the top wall of the tank 10, which it crosses in a vertical direction in a normal operating position. It is closed at its end outside the tank by a stopper (not shown).

The duct 102 is made up of two main portions: an upstream tube portion 104, and a downstream tube portion 106. The portion 104 is of smaller diameter than the portion 106. These two portions are connected together by a frustoconical junction 108.

The bottom end of the portion 106 is closed by a shutter 112 that plugs it.

The portion 106 (which constitutes the inside end of the duct 102, being situated inside the tank) has four outlet orifices 114 arranged at the same height and distributed at regular angular intervals around the periphery of the portion 106, at the high end of this portion in the vicinity of the junction 108.

Also, while the tank is being filled, fluid is injected into the duct 102 in the filling direction, i.e. downwards; the fluid leaves the duct through the only outlets available, which are the filler orifices 114 (arrow A).

The stopper 110 is a float and it presents a density (i.e. ratio of weight over volume) that enables it to float in the fluid contained in the tank. It thus constitutes a first float. The first stopper and the first float thus form a single part, so they are naturally mechanically connected together.

The float 110 is in the form of a sleeve and it is placed around the duct portion 106 on which it can move relatively freely. The portion 106 thus serves to guide the float 110 while it moves.

The shutter presents a blocking shoulder 116 in the form of an annulus is that extends radially outwards around the bottom end of the portion 106.

The shoulder 116 serves to limit upward movements of the float 110, and to prevent the float 110 becoming detached from the duct 102 and falling to the bottom of the tank 10.

While the tank is in use, the position of the float 110 depends only on the level of fluid inside the tank.

When the fluid level is low, the float 110 rests against the shoulder 116 (FIG. 3). The float 110 is then in a so-called "open" position, the orifices 114 then being open and enabling fluid to be injected into the tank.

When the level of the fluid is sufficient to raise the float 110, the float rises and slides upwards while being guided around the duct 102.

Because of this movement, it moves progressively in front of the outlet orifices 114 and plugs them progressively.

Once it has plugged the orifices 114 completely, the duct 102 is plugged and filling of the tank 10 stops. The float 110 stabilizes at the level of the line 16 in the position referred to as the "closed" position (FIG. 4).

It should be observed that when the float 110 stabilizes in this way at the level of the line 16, and plugs the duct 102 via the orifices 114, the duct 102 is full of fluid. The pressure of the fluid column thus contained in the duct 102 does not tend to lower the float 110 (acting as a first stopper), and the float 110 remains in the closed position.

The second stopper 120 is constituted by a ball. The diameter and the material of the ball, and also the shape of the junction portion 108, are selected in such a manner that the ball provides substantially leaktight closure of the duct 102 when it is pressed against the junction portion 108 (it is then in a "closed" position). The portion 108 can thus be referred to as the "seat" portion for the duct 102.

The ball 120 is placed inside the portion 106. The ball 120 rests on an end turn of a helical compression spring 122 arranged inside the portion 106 and coaxially therewith. The bottom end of the spring 122 bears against the shutter 112.

The length of the spring 122 is designed to ensure that the spring exerts thrust continuously against the ball 120 and holds it pressed against the junction portion 108.

Thereafter, except during periods of filling the tank, the ball 120 shuts the duct 102 and prevents any fluid from leaving the tank.

Conversely, during periods of filling the tank, fluid pressure on the ball causes it to move down a little, thereby allowing fluid to pass into the duct 102 in the portion 108 (FIG. 3).

The spring 122 thus constitutes a system for holding the second stopper (the ball 120).

Figure 5:
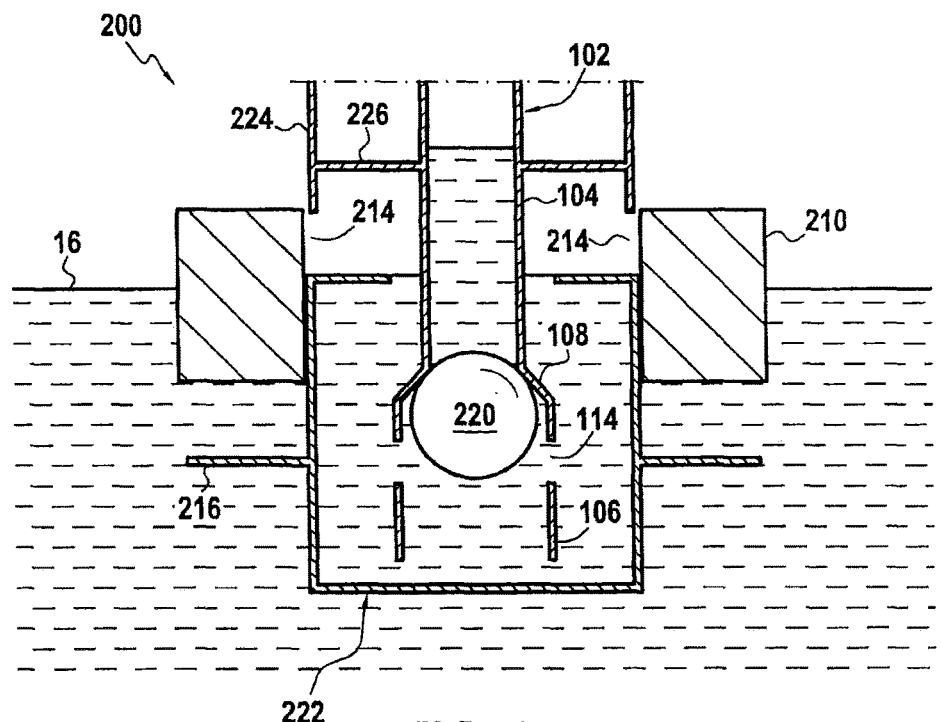
FIG. 5 is a fragmentary diagrammatic view in vertical section of a filler device in a second embodiment.

FIG. 5 shows a filler device 200 that differs from the device 100 mainly by the way in which the system for holding the second stopper is made in order to perform the fluid non-return function, and consequently by the means for guiding the first float 210.

The filler device 200 includes a fluid retention receptacle 222 arranged around the bottom end of the duct 102.

In this embodiment, the material (and/or the structure) of the ball 220 is/are selected to ensure that the ball floats in the fluid contained in the tank.

The receptacle 122 is made in such a manner that when the tank 10 is in a normal position, and consequently the duct 102 extends vertically, the receptacle 122 remains full of fluid, at least up to the level of the portion 108.

Consequently, the ball 220 is kept permanently submerged in the liquid.

Buoyancy thrust therefore acts on the ball and constitutes a return force tending to press it permanently against the portion 108, and thus to hold it in the closed position.

Thereafter, except during periods of filling the tank, the ball 220 shuts the duct 102 and prevents any fluid from leaving the tank.

Conversely, during periods of filling the tank, fluid pressure on the ball causes it to move down a little, thereby allowing fluid to pass into the duct 102 in the portion 108.

Furthermore, because of the presence of the receptacle 222, the shape of the first float 210, which constitutes the first stopper, is different from the shape of the float 110.

The receptacle 222 presents an outside wall 224 of cylindrical shape about a vertical axis. The walls of the receptacle 222 are leakproof with the exceptions firstly of the duct 102 passing through the top wall 226 of the receptacle, and secondly of four outlet orifices 214 arranged in the wall 224 at the same height.

Thereafter, the duct presents an end (the portion 106) that is connected in leaktight manner to the outlet orifices 214; as a result, the fluid that passes via the duct 102 can exit into the tank only by passing through the outlet orifices 214.

The receptacle 222 also presents an outer shoulder 216 on the wall 224. This shoulder performs the same function as the shoulder 116 in the device 100: i.e. it puts a limit on downward movement of the float 210.

The float 210 is in the form of a sleeve and is of dimensions suitable for enabling it to slide around the cylindrical wall 224. It operates in the same manner as the float 110:

When the fluid level inside the tank is low, the float 210 rests on the shoulder 216 and is in the "open" position, the orifices 214 then being open and thus allowing fluid to be injected into the tank.

When the fluid level is high enough to raise the float 210 and cause it to float, it separates from the shoulder 216 and slides upwards around the receptacle 222.

It can thus be seen that the system for holding the second stopper (including in particular the receptacle 222) can be arranged so as to serve as a guide for the first stopper 210.

When the level of fluid inside the tank is high enough, the first stopper 210 plugs the outlet orifices 214, thereby interrupting filling of the tank. The fluid level then stabilizes at the level of the line 16 (FIG. 5).

Figure 6:
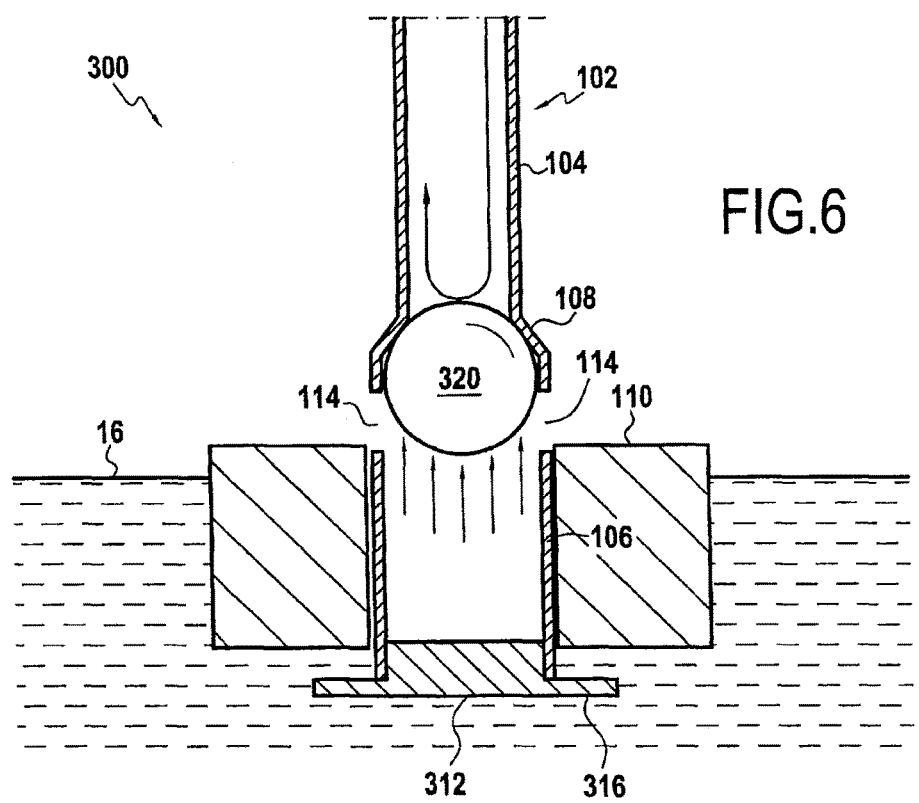
FIG. 6 is a fragmentary diagrammatic view in vertical section of a filler device in a third embodiment.

FIG. 6 shows a filler device 300 incorporated in a fluid tank 10. The device 300 differs from the device 100 mainly by the way in which the system for holding the second stopper is made in order to perform the fluid non-return function.

In this embodiment, the tank forms a piece of equipment forming part of a turbine engine that, in operation, maintains the tank at a pressure higher than atmospheric pressure.

The device 300 makes use of the pressure difference between the inside and the outside of the tank in order to perform the fluid non-return function.

Inside the device 300, the filler duct is formed as in the device 100, comprising two vertical tube portions 104 and 106 that are connected together by a junction 108.

The second stopper is constituted by a ball 320 that is arranged in the portion 106 of the filler duct. The ball 320 is made of light material. Its diameter is selected so that it can be pressed against the junction 108 in order to plug the duct 102.

When the ball 320 is not placed against the junction 108, the ball moves down under the effect of its weight into the tube portion 106 and is supported by a shutter 312 provided for plugging the internal end of the portion 106. It is then in the "open" position.

The device 300 operates as follows. Unlike the operation of the balls 120 and 220 in the above-described embodiments, the ball 320 does not automatically take up the closed position as soon as filling is interrupted.

In the device 300, it is specifically air leaving the tank 10, or in any event fluid beginning to leave the tank via the filler duct 102, that places the ball 320 in the closed position.

Specifically, as soon as air or fluid starts to leave via the filler duct, this flow immediately entrains the ball 320. The ball becomes pressed against the junction 108, thereby plugging the duct 102. The ball 320 then remains held in position by the difference in pressure that exists between the inside and the outside of the tank.

Because of this, the ball 320 prevents any fluid leaving the tank and thus provides the desired non-return function.

Conversely, as soon as fluid is injected into the tank in order to fill it, the pressure of the fluid on the ball 320 separates the ball from the junction 108, thereby causing the ball to drop back onto the shutter 312 in its open position, i.e. a position in which it is possible to inject fluid into the tank 10.

Subsequently, the ball 320 returns to its closed position once injection of fluid into the tank has been interrupted, as soon as any flow of air or fluid tends to restart in the duct 102.

Figure 7:
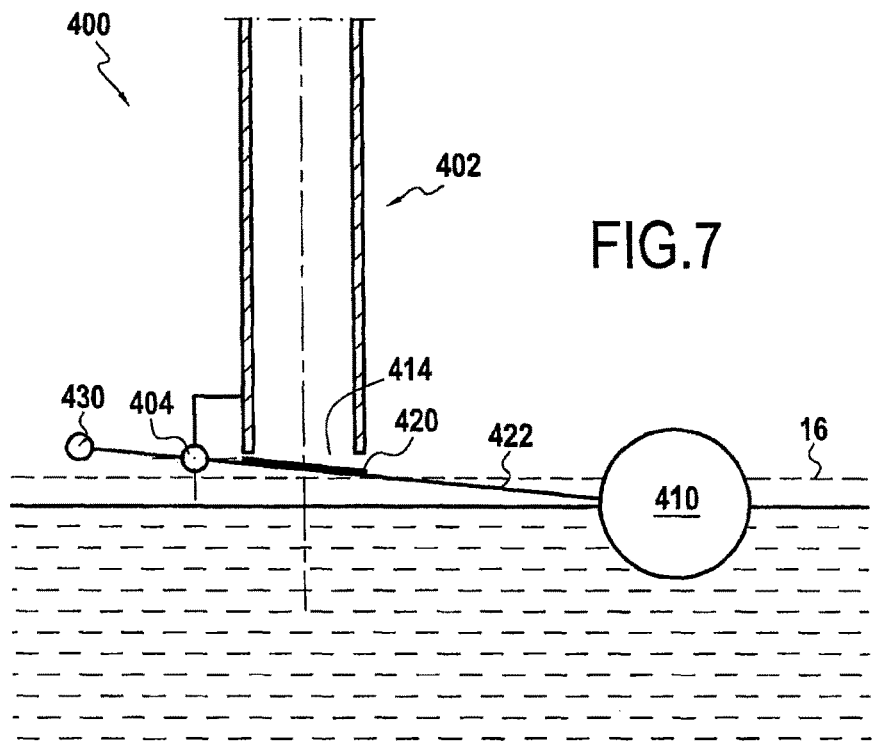
FIG. 7 is a fragmentary diagrammatic view in vertical section of a filler device in a fourth embodiment.

FIG. 7 shows a filler device 400 in accordance with the invention.

The device 400 comprises a filler duct 402 constituted by a simple straight tube that extends through the top wall of the tank 10.

The internal end of the tube presents a fluid outlet orifice lying on the axis of the tube.

The device 400 also has a float 410, a stopper 420, and a counterweight 430.

The float 410 (constituting the first float) and the stopper 420 (constituting the first stopper) are fastened on a lever arm 422 mounted on a pivot 404 that is fixed relative to the duct 402.

The counterweight 430 is fastened to a first end of the lever arm 422, on a first side of the pivot 404.

The float 410 is fastened to the end of the arm 422 opposite from its first end. The stopper 420 is interposed between the pivot 404 and the float 410.

The device 400 is arranged in such a manner that pivoting of the lever arm 422 about the pivot 404 moves the stopper 420 between its open and closed positions.

In FIG. 7, the stopper 420 is shown in the open position, i.e. specifically it is not pressed against the outlet orifice 414 of the duct 402.

The closed position of the stopper 420 is the position in which it is pressed against the orifice 414.

Advantageously, the stopper 420 is both the first stopper and the second stopper in the meaning of the invention. This is made possible by the fact that the actions firstly of the first float 410, and secondly of the holding system provided in the device 400, combine to place the stopper 420 appropriately in the open or closed position, with this taking place as follows:

Except during periods of filling, and providing the level of fluid in the tank is sufficiently low, the position of the lever arm 422 is determined by the opening moment of the float 410 and by the closing moment of the counterweight 430, as results in particular from their respective weights.

These moments are given these names because the moment applied by the counterweight 430 the lever arm 422 tends to place the stopper 420 in the closed position, whereas the moment generated by the float 410 tends to place the stopper 420 in the open position.

When the float 410 is not pushed upwards by the buoyancy force exerted by the liquid (as a result of the fluid level in the tank being sufficiently low), the float 410 and the counterweight 430 are of dimensions and positions such that the closing moment of the counterweight 430 overrides the opening moment of the float 410. Thereafter, in this situation, the lever arm 422 holds the stopper 420 in the closed position.

In this position, the stopper 420 performs a fluid non-return function.

In contrast, while the tank is being filled, the pressure of the fluid being injected into the duct 402 and acting on the stopper 420 generates an opening moment that is applied to the lever arm 422. This opening moment plus the opening moment of the float 410 overcomes the closing moment caused by the counterweight 430, and leads to the orifice 414 of the duct 402 being opened, thereby enabling fluid to be injected into the tank.

As fluid is injected progressively into the tank, the level of fluid rises in the tank. As from a certain level, the float 410 comes into contact with the fluid and begins to float and to move upwards. Since the float 410 is held by the lever arm 422, it begins to pivot about the pivot 404.

Under such circumstances, i.e. when the float 410 is floating on the surface of the fluid, the float 410 generates a closing moment, and no longer an opening moment, which moment is added to the closing moment of the counterweight 430.

The counterweight 430, the float 410, the pivot 404, and the arm 422 are arranged and dimensioned in such a manner that the closing moment that results from adding the moments of the counterweight 430 and of the float 410 is greater than the opening moment generated by the fluid pressure acting on the stopper 420 once the fluid level reaches a maximum desired level (line 16).

Consequently, when the level of fluid in the tank rises, as the float 410 moves upwards, the lever arm 422 pivots.

There thus comes a moment when the opening 414 is closed, thereby interrupting the filling of the tank. By virtue of this interruption, the device 400 performs the desired function of preventing the tank 10 from being filled excessively.

Figure 8:
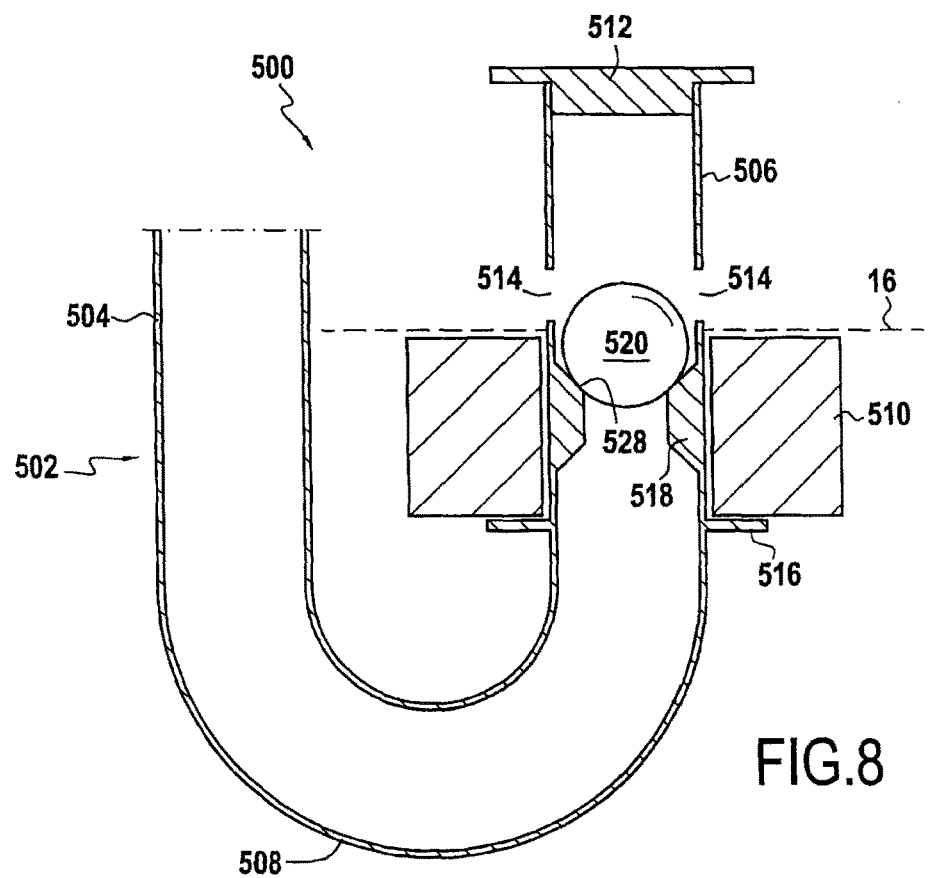
FIG. 8 is a fragmentary diagrammatic view in vertical section of a filler device in a fifth embodiment.

FIG. 8 shows a filler device 500 that constitutes another embodiment of the invention.

The device 500 comprises in particular a filler duct 502, a float 510, and a ball 520.

The filler duct 502 is constituted by a tube that presents in succession going from the outside towards the inside of the tank: a first straight portion 504 extending vertically and passing through the top wall of the tank 10 (not shown), a bend portion 508 forming a 180° bend, and a second straight portion 506.

The end of the duct 502 is plugged by a shutter 512.

Because of the bend 508, the straight portion 506 extends in the vertical direction, with the shutter being on top (when the tank 10 is in its normal position). The portion 506 has fluid outlet orifices 504 that are situated at the same height. It also has a shoulder 516 that performs the same function as the above-described shoulders 216 and 316, namely limiting the downward stroke of the float 510.

The float 510 is in the form of a sleeve and is arranged around the portion 506. It operates in the same manner as the float 110, so as to plug the outlet orifices 514 as soon as the fluid level reaches the line 16 (the float 110 then being in the position that is shown in FIG. 4), and conversely to allow fluid to pass when the fluid level is lower.

The ball 520 constitutes an element that is "heavy" in the meaning of the invention, i.e. it is the weight acting on the ball that enables it to perform its non-return function.

For this purpose, an annular abutment 518 is arranged inside the portion 506. The abutment is arranged in such a manner as to prevent the ball 520 from moving down beyond a predetermined lowest position.

Furthermore, the abutment 518 has a seat surface 528 arranged so that the ball 520 can plug the duct 502. Thus, when, under the effect of its own weight, the ball 520 moves down into the portion 506 (in which it is placed), it spontaneously becomes positioned on the surface 528 and then shuts the duct 502.

Conversely, while the duct 502 is being used for filling, the ball 520 is raised by the flow of outgoing fluid and rises into the portion 506, so as to allow the fluid to pass through the orifices 514. Thus, while nevertheless performing the non-return function, the ball 520 does not prevent the tank from being filled.

During filling of the tank, the shutter 512 serves to prevent the ball 520 being ejected by the fluid out from the duct portion 506.

The invention claimed is:

1. A filler device for a fluid tank, the filler device comprising:
    a filler duct;
    a first stopper, for preventing overfilling of the tank, and a second stopper for preventing fluid from leaving the tank in unwanted manner;
    a first float mechanically connected to the first stopper such that placing the first float in a predetermined position places the first stopper in a substantially closed position; and
    a holder system for holding the second stopper, which system acts to place the second stopper in the closed position, and when a fluid passes along the duct in the filling direction, to place the second stopper in the open position; and
    wherein each of the stoppers is configured to be placed in an open position to allow fluid to pass along the duct, or in a closed position to plug the duct;
    wherein the holder system is arranged such that in an operating position of the device, under effect of weight of a heavy element, the holder system tends permanently to maintain the second stopper in its closed position;
    the heavy element includes a ball or a weight that also constitutes the second stopper;
    an internal surface of the duct presents a seat portion;
    the duct is arranged such that in the normal position of the device, under effect of gravity, the ball or weight tends to move onto the seat position and thus to plug the duct; and
    the seat portion is formed in a filling direction downstream from a bend forming an angle close to 180°.

2. A device according to claim 1, wherein the first float and the first stopper are the same.

3. A device according to claim 1, wherein an internal surface of the duct presents a seat portion, and in the closed position, the second stopper plugs the duct at the seat portion.

4. A device according to claim 1, wherein the duct presents one end connected in a leaktight manner to at least one outlet orifice, and in the closed position, the first stopper plugs the at least one outlet orifice.

5. A device according to claim 1, further comprising a guide configured to guide the first float to move in translation.

6. A device according to claim 5, wherein the guide includes a tubular portion of the duct around which the first float is arranged.

7. A device according to claim 6, wherein the first float is in a form of a sleeve.

8. A device according to claim 1, wherein the second stopper is arranged such that, if pressure inside the tank is greater than pressure outside the tank, the pressure difference between the tank and outside of the tank holds the second stopper in the closed position.

9. A device according to claim 1, wherein when the first float is placed in the predetermined position, the first stopper remains in a substantially closed position, with this continuing even when an upstream portion of the duct, situated upstream from the first stopper in the filling direction, is full of fluid.

10. A fluid tank comprising a device according to claim 1.

* * * * *